(12) United States Patent
Dees

(10) Patent No.: US 8,479,101 B2
(45) Date of Patent: Jul. 2, 2013

(54) CONSISTENT USER INTERFACE FRONT END FOR REMOTE USER INTERFACES

(75) Inventor: Walter Dees, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1305 days.

(21) Appl. No.: 10/579,158

(22) PCT Filed: Nov. 11, 2004

(86) PCT No.: PCT/IB2004/052391
§ 371 (c)(1),
(2), (4) Date: May 12, 2006

(87) PCT Pub. No.: WO2005/048537
PCT Pub. Date: May 26, 2005

(65) Prior Publication Data
US 2007/0156894 A1    Jul. 5, 2007

Related U.S. Application Data

(60) Provisional application No. 60/519,807, filed on Nov. 13, 2003.

(51) Int. Cl.
*G06F 3/00*    (2006.01)
(52) U.S. Cl.
USPC .......................................................... 715/740
(58) Field of Classification Search
USPC .......................................... 709/225; 715/740
See application file for complete search history.

(56) References Cited

U.S. PATENT DOCUMENTS

| 5,889,516 | A  | * | 3/1999 | Hickey et al. | 715/740 |
|---|---|---|---|---|---|
| 5,949,412 | A  | * | 9/1999 | Huntsman | 715/740 |
| 6,020,881 | A  | * | 2/2000 | Naughton et al. | 715/740 |
| 6,313,851 | B1 | * | 11/2001 | Matthews et al. | 715/718 |
| 6,507,351 | B1 | * | 1/2003 | Bixler | 715/810 |
| 6,538,668 | B1 | * | 3/2003 | Ruberg et al. | 715/747 |
| 6,597,374 | B1 | * | 7/2003 | Baker et al. | 715/717 |
| 6,674,450 | B1 | * | 1/2004 | Toub et al. | 715/749 |
| 6,680,730 | B1 | * | 1/2004 | Shields et al. | 345/169 |
| 6,745,252 | B1 | * | 6/2004 | Yanagawa et al. | 710/8 |
| 6,785,579 | B2 | * | 8/2004 | Huang et al. | 700/65 |
| 6,844,886 | B1 | * | 1/2005 | Yanagawa et al. | 715/744 |
| 6,870,555 | B2 | * | 3/2005 | Sekiguchi | 715/740 |
| 7,027,881 | B2 | * | 4/2006 | Yumoto et al. | 700/65 |
| 7,240,289 | B2 | * | 7/2007 | Naughton et al. | 715/740 |
| 7,243,151 | B2 | * | 7/2007 | Sekiguchi | 709/227 |
| 7,293,236 | B2 | * | 11/2007 | Choi et al. | 715/734 |
| 2001/0009424 | A1 | * | 7/2001 | Sekiguchi | 345/740 |
| 2002/0051012 | A1 | * | 5/2002 | Gomes et al. | 345/740 |
| 2002/0059425 | A1 |   | 5/2002 | Belfiore et al. | 709/226 |
| 2002/0154161 | A1 | * | 10/2002 | Friedman et al. | 345/740 |
| 2003/0220820 | A1 |   | 11/2003 | Sears et al. | 705/3 |
| 2003/0234809 | A1 | * | 12/2003 | Parker et al. | 345/740 |

FOREIGN PATENT DOCUMENTS

EP    0707265 A2    4/1996

* cited by examiner

*Primary Examiner* — Thanh Vu

(57) ABSTRACT

A method and device for providing a single consistent user interface based on replacing disparate user interface constructs (components) with equivalent constructs (components) from a "synonym" database of user interface constructs (components). The database is initiated with a set of foundational "synonym" constructs (components) and extended with user interface constructs (components) as they are discovered during reduction of an inconsistent user interface to a consistent state.

31 Claims, 3 Drawing Sheets

CONSISTENT USER INTERFACE FRONT END FOR REMOTE USER INTERFACES

CROSS REFERENCE TO RELATED APPLICATION

This application claims the benefit of U.S. provisional application Ser. No. 60/519,807 filed Nov. 13, 2003, which is incorporated herein in whole by reference.

The present invention relates to a system and method for a consistent front end for remote and local user interfaces.

Throughout the following text the Glossary and Abbreviations at the end of the description are employed, usually without reference to same. It is to be understood that these terms are used in the sense defined herein if there is a conflict between the ordinary meaning of these terms and the terms defined herein.

User interfaces are playing an increasingly important role in home networking. In the area of universal plug-and-play (UPnP), however, almost no standards have been either developed or proposed concerning user interfaces. Developers of user interface (UI) devices, consequently have complete freedom to create applications and user interfaces for controlling services in a home network. Controlled devices, such as an audio device or a DVD+RW device, currently can optionally provide an HTML-page as a user interface. Except using optional HTML-pages they have, in fact, very limited control over the appearance of a user interface that is used on a UI device and can never be sure that their distinguishing features are accessible from these UI devices. Furthermore, some home networking scenarios, such as session migration and the use of multiple output devices simultaneously, are difficult to realize if the ownership of applications and user interfaces belong solely to UI devices.

Remote UI technology is becoming an important technology in this area (next to local UIs) in order to deal with these limitations. PC manufacturers use it to allow applications running on a PC to be used on thin-client devices. Remote UI technology also enables a controlled device, such as a DVD+RW, to offer applications and UIs together with its services to other devices in a home network. This provides a way for developers to maintain ownership of user interfaces and applications since, it is important for participants to be able to distinguish themselves from others. Remote UI technology may also reduce the costs for upgrading UI devices. Therefore, it is likely that the various developers will want to have control over both, applications and their user interfaces, and that multiple scenarios of remote UI ownership will co-exist, driven by the marketplace for this technology.

Dealing with user interfaces in a home network is a very complex issue. Because of the large number of developers participating in this technology, very flexible solutions and more open devices are needed in order to meet all their requirements, such as providing a good out-of-the-box experience, being able to handle all kinds of (future) devices, services, applications, different configurations, and multi-user scenarios.

The pair of usage scenarios contained in Appendix A has been promulgated as a basis for developing UPnP remote I/O standards and is typical of home network usage. Considering these usage scenarios as a starting point, the following requirements are important for user interfaces in a home network.

It must be possible to make use of the functionality that is offered by the services, devices, and applications within a home network via UI devices, preferably using a UI with a developer-specific look & feel. Generic UI devices must provide support for the majority of services/devices/applications that are available in a home network.

UI devices can have varying capabilities, such as screen size, I/O modalities, etc. User interfaces must be tailored as much as possible to the specifics of the UI device, instead of a free-floating cursor (like in mouse-based systems) on a TV using a standard remote control, and not requiring extensive use of scrolling on a small-screen display. Furthermore, devices can be very resource constrained.

In order to be successful, home network products must not be more difficult to use than non-networked products. UIs must automatically deal with network configuration changes. In addition, it is important that UIs be consistent (for similar controlled devices as well as among UI devices from different vendors). This means, for example, that:

a) preferably, all user interfaces on a generic UI device have the same look & feel, for example, changing volume is done with the same UI for every device and not by having a completely different UI for every developer (e.g. a slider with label "Volume" in one case and a rotating knob with label "Vol. Level" in another case), and b) the interaction with a particular device/service/application must be similar among all the UI devices (e.g. not show "Play from DVR" on one UI device, "Play from HD" on a another device and "Play MPEG-2 files" on a PC, because this might create confusion and annoyance among users.

The cost for adding networking capabilities to devices must be kept at a minimum. In addition to the scenarios of Appendix A, the following scenarios are important scenarios that networked user interface technology must be able to support:

a) Access to content and control of devices: It must be possible for the user to have access to the content that is available in the network as well as the ability to control devices and services, from any compatible device anywhere inside the home, and in a coherent way. It must be possible, for example, to browse/search through all the content as if it were a single database (at least per category, such as through all MP3s), and render the desired content on a user-specified compatible rendering target. Besides content-browsing and device control applications, networked user interfaces must also be able to support communication-based applications, e-commerce, information services, games, productivity applications, and so on.

b) Out-of-the-box experience: It must be easy for the user to add new devices to the home network. Example: User X has just purchased a generic UI device to control his home network. His home network consists of several UPnP devices. After switching on the control device it shows him that it has successfully detected several CE devices and that it has automatically downloaded the newest drivers for most of them. Unfortunately, one of them is not supported. The control device support center has been contacted about the problem and the user will be notified automatically when an update is available. In the meantime, the user is advised to download and install some bridging software from the control device support center to the user's PC, with which the user can create simple HTML pages from service descriptions for use in the mean-time.
c) Multiple users: Typically, a home network is used by more than one person. Different family members may want to use the same devices/services/applications of an in-home network at the same time. Therefore, it must be easy to switch to an alternative service or service instance, or to another UI device. It is desirable to share the same resource (e.g. an application) with other people. For example, it must be possible to play a game against each other, where each player has their own UI device and their own view of the same application. Synchronization is very important in such applications in a home network.
d) Personalization: The settings of one user are probably not applicable to other users (e.g. musical preferences in an mp3-jukebox application). Furthermore, there is a need for communication among users. For example, send a "dinner is ready" message to everybody using the home network.
e) Multiple 110 devices: It must be possible to use multiple input and multiple output (i.e. multiple UI) devices for the same application at the same time, to enable UIs where the graphical part of the UI is shown on the TV and the audible part of the UI is redirected to the speakers that are closest to the user. Or, to enable applications such as an intelligent photo browser with which the user can redirect pictures from a mobile device to a bigger screen.

Thus, there is a need for consistency of user interfaces across consumer electronic (CE) devices that are resident in a home network.

The present invention provides a system and method that uses an extensible database of "synonyms" containing constructs of a UI that can be used to replace correspondingly similar UI constructs (also called components) of a CE device, such as labels of UI elements and common user interface patterns, wherein a CE device can make incoming remote UIs more consistent with one another. In a preferred embodiment of a home network, one CE device is typically a UI control device for all the CE devices in the network. On power-up, each of the CE devices sends its UI to the control CE device and it is replaced with a consistent UI, according to a preferred embodiment, whenever the control device presents that UI to a user.

The database of "synonyms" is used by the control CE device by examining each incoming remote UI for constructs and matching these found UI constructs with known similar "synonyms" in the database. Optionally, those found UI constructs that are not already in the database can be added to the database during this process (by the CE device locally and by downloading the found constructs to a CE device service center). A basic set of these "synonyms" is provided to initiate this system and method.

Note: the above described usage of a database of "synonyms" is not to be confused with using synonyms in speech where the intent is to extend the expressiveness of language by introducing equivalent terms. Here, the intent is to limit the variety of expression to a single consistent set of constructs based on equivalency of a variety of terms.

The foregoing and other features and advantages of the invention will be apparent from the following, more detailed description of preferred embodiments as illustrated in the accompanying drawings in which reference characters refer to the same parts throughout the various views.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
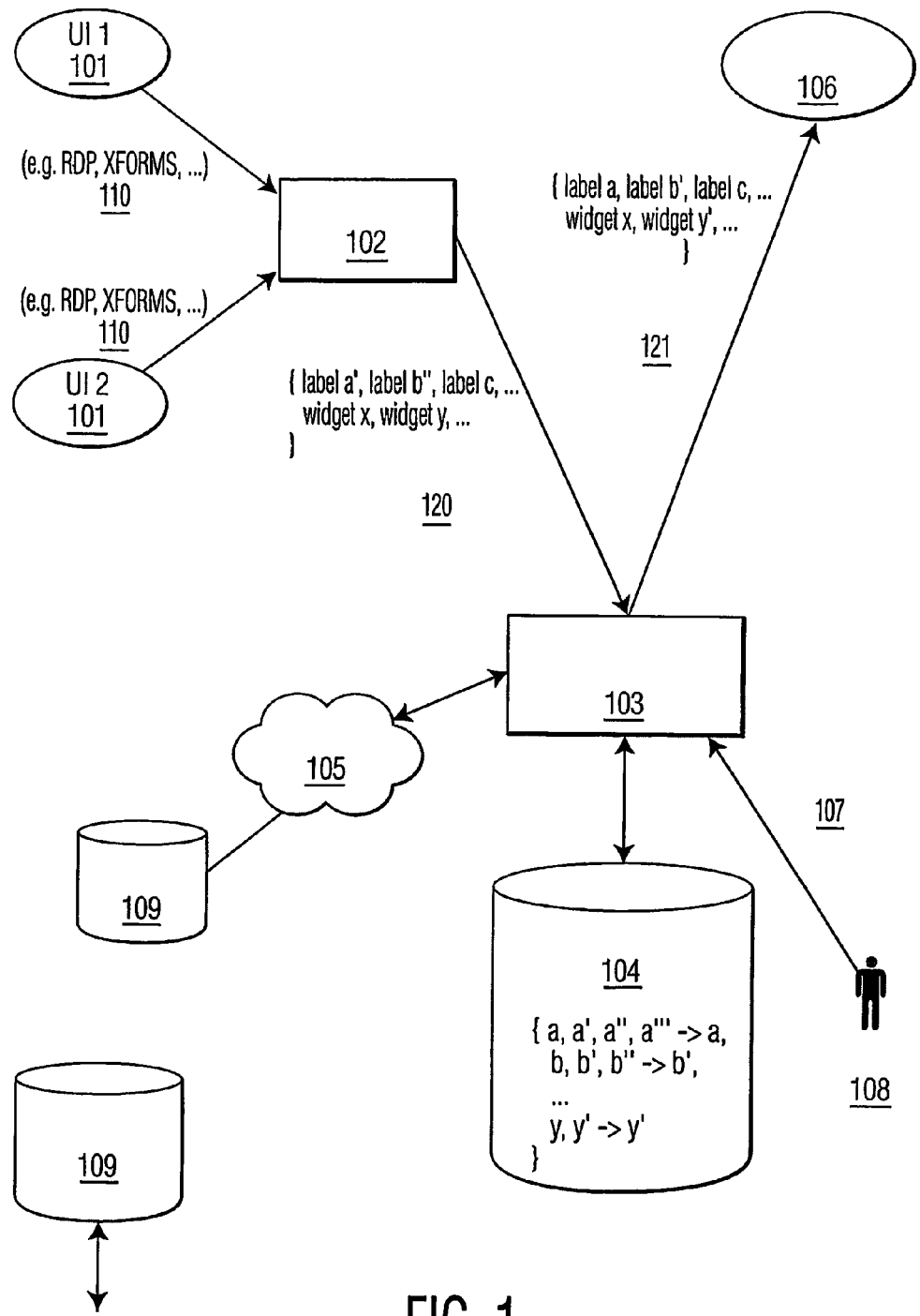
FIG. 1 illustrates the process of finding and substituting synonyms for remote UI components according to the present invention.

A preferred embodiment of the present invention is illustrated in FIG. 1, in which one or more controlled devices can provide multiple remote user interface alternatives to the UI device 200. In order for a UI device to know which mechanisms are offered by a controlled device (and vice versa), it must be possible to discover this information. This discovery can be accomplished, for example, by means of a Remote I/O capability description which can be found in a similar way as service descriptions. After this information has been retrieved, a protocol can be chosen that is best suited for the situation.

One or more (remote) RUI definitions 101, which can be in any format, including RDP, X-Windows, VNC, HTTP, HAVi DDI, and UI Fragments, XForms and Java AWT, are taken (simultaneously) as input to an extraction process 102, where the relevant user interface data (i.e. assets) that makes up the user interface (such as labels, bitmaps, widgets) 120 are extracted from the incoming 110 UI definition. If the UI definition input 110 is defined on an abstract level, such as XForms, then this is accomplished in a relatively straightforward manner, as is known in the art. For less abstract or mixed input (such as RDP or HTML) known techniques such as model recovery [1] are applied to extract the relevant UI data 120 and the underlying semantic model of the UI from the incoming concrete UI 110.

After the extraction process 102 the user interface data is analyzed and transformed (syntactically or semantically) 103 using a database of "synonyms" 104:

| ORIGINAL | SYNONYM |
|---|---|
| a, a', a'', a''' | a |
| b, b', b'' | b' |
| x | x |
| y, y' | y' |
| ... | ... |

If a match is found, and analysis of the user interface, with user preferences taken into consideration 107, shows that this replacement will indeed improve the user interface (e.g. by calculating a measure of confidence, and, optionally, through learning from previous analyses and transformations), then the preferred "synonym" replaces the original input 120 and the modified UI information 121 is output, which can be used to render the UI 106:

| UI | MODIFIED UI |
|---|---|
| label a' | label a |
| label b" | label b' |
| label c | label c |
| widget x | widget x |
| widget y | widget y' |
| ... | ... |

If no match is found, the system connects to the Internet 105 to check on-line thesauri 109 or other relevant databases. If still no match is found, the original value remains in the UI.

The preferred "synonym" which is used for transformation can either be a default value (e.g. the first in the list) or one which is selected by a user 108. In a preferred embodiment, the user is allowed to add "synonyms", for example, to give names to devices and processes in a home network by inputting preferences 107. After this transformation step 103, the modified UI 106 is either shown to the user 108 or transferred to another device. In the first case, the synonym transformation process is done on a UI device. In the latter case, the synonym transformation process is offered as a service in the network.

Figure 2:
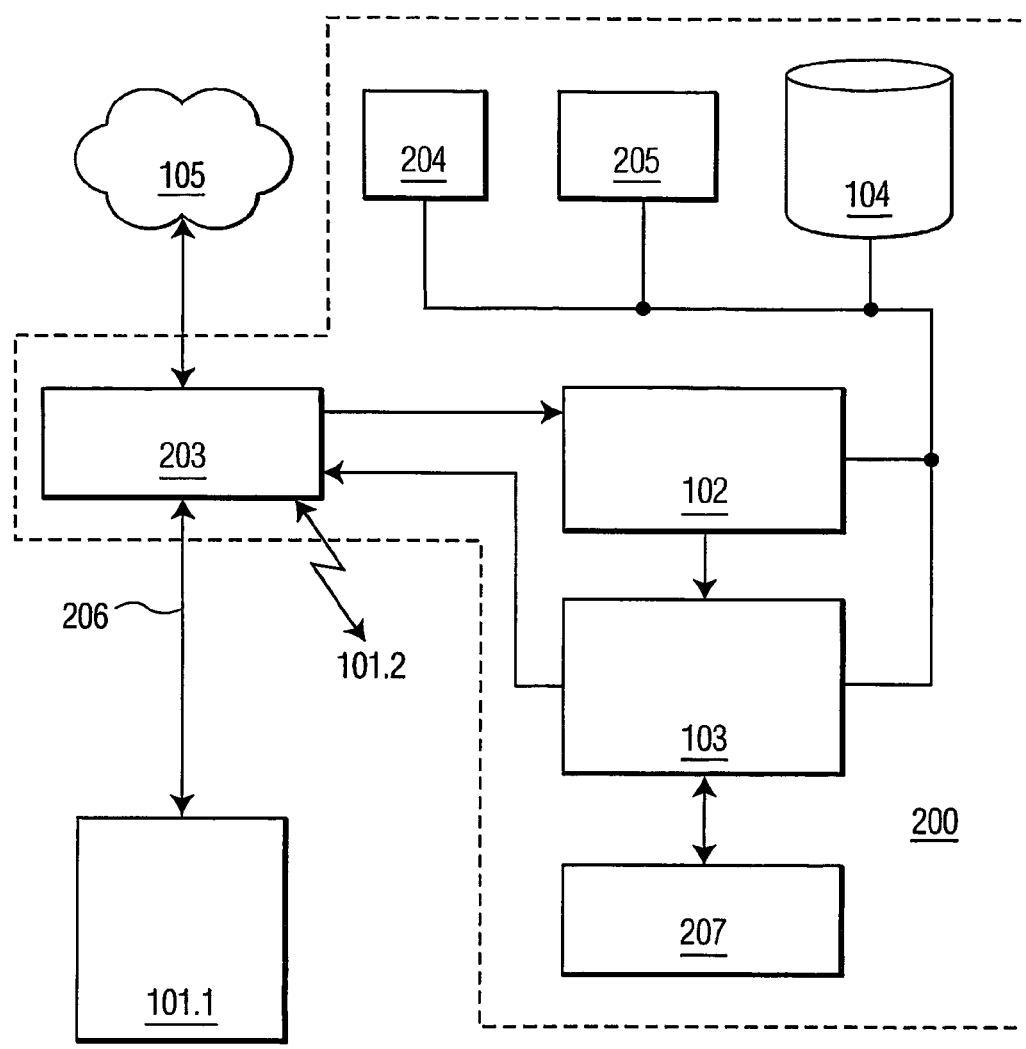
FIG. 2 illustrates an example of hardware components of a control device within a home network that can be used to perform the present invention.
Figure 3:
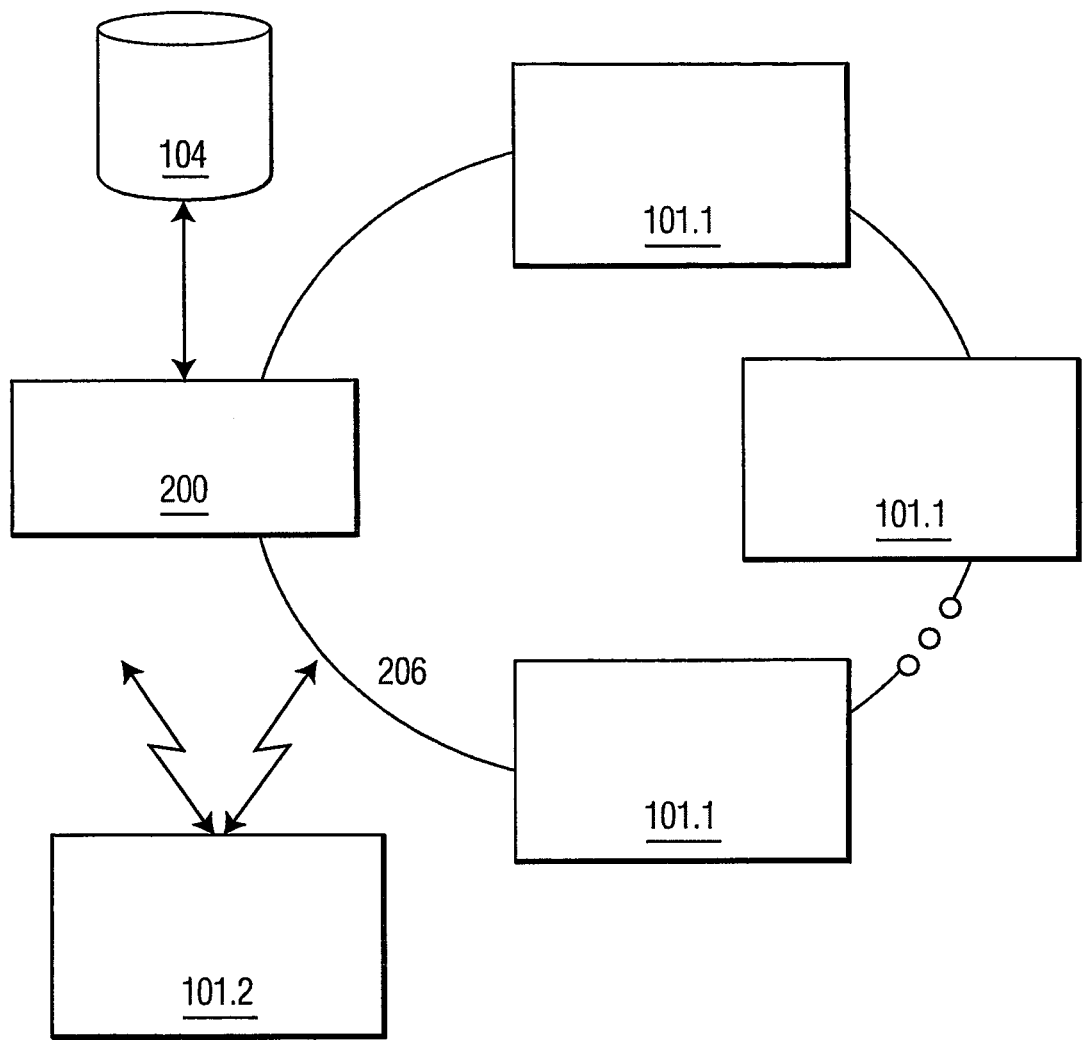
FIG. 3 illustrates a typical home network with a control CE device and slave CE devices whereto embodiments of the present invention can be applied.

Referring to FIG. 2, the control CE device within the home network of FIG. 3 may include a system with an architecture that is illustrated in the block diagram of FIG. 2. On power up, each slave CE device 101 transmits its RUI 110 to the control CE device 200 for a consistent presentation of its UI to a user by the control CE device 200. The control CE device 200 may include a transceiver 203, an extraction logic module 102, an analysis and transformation module 103, a synonym database 104, a memory 205 and a timer 204. The exemplary system 200 of FIG. 2 is for descriptive purposes only. Although the description may refer to terms commonly used in describing particular control CE devices, the description and concepts equally apply to other processing systems, including systems having architectures dissimilar to that shown in FIG. 2.

In operation, the transceiver 203 is coupled to an antenna (not shown) and to a wireline to transmit and receive data to and from wireless and wired slave CE devices 101.2 and 101.1, respectively. The extraction logic module 102 extracts components of a received slave device UI definition. After the extraction process 102 the extracted UI data 120 is analyzed and transformed by an analysis and transformation module 103 to replace components of the received slave device UI 120 with matching synonyms from the synonym database 104 to produce a transformed UI definition 121, and is displayed on the user interface module 207 as the interface to the remote (slave) device or is transmitted by transceiver 203 to a second (or third, etc.) control device (not shown). The memory 205 is used by both the extraction logic module and the analysis and transformation module 103 to store learning derived from previous processing of slave CE device UIs and optionally update the synonym database 104 therewith. The timer 204 is used by the logic modules for time dependent processes, such as outdated transformed UIs for slave CE devices that have powered down.

FIG. 3 illustrates a representative home network whereto embodiments of the present invention are to be applied. As shown in FIG. 3, a control CE device 200 is coupled to a plurality of slave wired and wireless CE devices 101, which, through the wireline and wireless links of a home network 206 communicate their UIs to the control CE device 200. A key principle of the present invention is to provide a mechanism to substitute components of a consistent user interface for similar components in each slave CE device UI 101. The control CE device 200 performs an extraction of user interface components and then analyzes and transforms 103 them to finally yield a transformed UI 106 for each slave CE device 101. Although a limited number of CE devices is shown in FIG. 3 for illustrative purposes, it is to be understood that the home network can support communications between a much larger number of CE devices. Thus, the number of CE devices in FIG. 3 should not impose limitations on the scope of the invention. Further, the home network can be based on any of interne protocol (IP) (RFC 791), NETBEUI, Bluetooth, Zigbee, SCP, IEC61883, DVB and ATSC DTV.

In replacing components of the remote user interface, one or more control devices can be employ different replacement paradigms comprising predetermined similarity measures between components of the CUI and the RUI, predetermined improvement measures in the consistency of the RUI after replacement of an RUI component by a CUI component (this can be a cumulative measure depending on the number of such replacements or mappings), predetermined difference measures between components of the CUI and the RUI.

In an alternative embodiment, the control device also has one or more local UIs (LUIs), i.e. a user interface for a local application (see Glossary term "Application"), that it can display, in addition to displaying RUIs. Since these LUIs may contain some user interface constructs (components), which are similar to constructs (components) used in an incoming RUI, it is useful to make the incoming RUIs not only consistent with each other but also with LUIs (so if the label "Play from DVR" is the preferred synonym, then this label has to be used in the RUIs as well as the LUIs). In a preferred embodiment, the synonym that is chosen in the transformation process 103 is the synonym that is used in an LUI, in order to make the incoming RUIs more consistent with LUIs of a control device.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention can be adapted in ways that are equivalent without departing from its central scope. Therefore it is intended that the present invention not be limited to the particular embodiment disclosed as the best mode contemplated for carrying out the present invention, but that the present invention include all embodiments falling within the scope of the appended claims.

The invention claimed is:

1. A method for a consistent user interface (CUI) on a control device providing access to at least one network device having a remote user interface (RUI), comprising the acts of:
   providing the CUI to the control device;
   mapping the RUI to the CUI by the control device by replacing the RUI with a synonym that matches the RUI, the synonym being included in a synonym database; and
   displaying by the control device at least a part of the CUI that includes the synonym instead of the RUI as a user interface to the network device, wherein the CUI is more consistent with user interfaces of further network devices so that the control device presents a user the user interface that includes the CUI for controlling the network device and the further devices.

2. The method of claim 1, wherein:
   the providing act further comprises the acts of:
   receiving by the control device an RUI definition comprising at least one RUI component;

providing the CUI comprising at least one CUI component pre-set as the synonym for said at least one RUI component; and the mapping act further comprises the act of replacing the received at least one RUI component with said pre-set synonym CUI component by the control device whenever the control device displays a user interface to the network device.

3. The method of claim 2, further comprising the act of transmitting the RUI definition by the at least one network device.

4. The method of claim 3, wherein said transmitting act further comprises the act of on power-up, transmitting the RUI definition by the at least one network device.

5. The method of claim 3, wherein said transmitting act further comprises the act of transmitting the RUI definition using a network based on at least one of IP (RFC 791), NETBEUI, Bluetooth, Zigbee, SCP, IEC61883, DVB and ATSC DTV.

6. The method of claim 5, wherein said transmitting act further comprises the act of transmitting the RUI definition using a protocol based on at least one of RDP, X-Windows, VNC, HTTP, HAVi DDI, and UI Fragments.

7. The method of claim 5, wherein said receiving act further comprises the act of using by the at least one network device for the RUI definition a UI description format based on at least one of HTML, XML, Macromedia, Flash and Java.

8. The method of claim 7, further comprising the act of transmitting a RUI definition by at least a second network device to the control device using at least one of a different protocol selected from the set consisting of RDP, X-Windows, VNC, HTTP, HAVi DDI, and UI Fragments and a different UI description format selected from the group consisting of HTML, XML, Macromedia, Flash and Java than the corresponding protocol and description format used by the at least one network device.

9. The method of claim 3, further comprising the act of sending the provided CUI to at least one of the at least one network device and a second control device.

10. The method of claim 1, wherein:
the RUI and CUI comprise at least one RUI component and at least one CUI component, respectively; and
further comprising the acts of:
extracting said at least one RUI component by the control device;
determining by the control device if said at least one CUI component is the synonym for the extracted at least one RUI component; and
wherein, said mapping act further comprises the act of
if said at least one CUI component is determined to be the synonym for the extracted at least one RUI component, mapping the at least one extracted RUI component to the determined said at least one CUI component.

11. The method of claim 10, further comprising the act of finding at least one CUI component that satisfies a predetermined similarity measure to said at least one RUI component for a plurality of network devices.

12. The method of claim 10, further comprising the act of finding at least one CUI component that satisfies a predetermined consistency measure of the mapped at least one RUI component.

13. The method of claim 10, wherein said determining act further comprises the act of searching at least one of a thesaurus and a synonym database for a synonym of the extracted at least one RUI component that matches said at least one CUI component.

14. The method claim 13, further comprising the act of storing said matching synonym determined from the thesaurus in the synonym database for the extracted at least one RUI component.

15. The method of claim 14 wherein said at least one thesaurus is located on a second network and said at least one network device is located on a first network.

16. The method of claim 15, wherein said second network is the Internet.

17. The method of claim 15, wherein said first network is a home network and said network device is a consumer electronic device.

18. The method of claim 10, wherein:
said at least one network device further comprises at least one application local to the control device and said RUI further comprises at least one local user interface (LUI) to said at least one local application.

19. The method of claim 1, wherein said at least a part of the CUI is determined according to a set of user preferences.

20. The method of claim 1, wherein:
said at least one network device further comprises at least one application local to the control device and said RUI further comprises at least one local user interface (LUI) to said at least one local application.

21. A method for a slave network device to replace a remote user interface (RUI) with a consistent user interface (CUI), comprising the acts of:
transmitting by the slave network device the RUI to a control network device; and
replacing by the control network device at least a part of the transmitted RUI with at least a part of the consistent CUI by the method of claim 1.

22. A control device that provides a consistent user interface (CUI) in a network of at least one slave device having a remote user interface (RUI), comprising:
a transceiver for receiving the RUI;
an extraction logic module configured to extract at least one component of the RUI;
a database that is configured to store synonyms of components of an RUI; and
an analysis and transformation module configured to
i. map the extracted at least one component of the RUI to a component of the CUI according at least one of the synonyms stored in said database and a thesauri by replacing the RUI with the at least one of the synonyms that matches the RUI,
ii. store the mapping in a memory,
iii. optionally update the synonym database with the mapping, and
iv. provide a user interface to the at least one slave device according to at least a part of the mapping of the extracted at least one component of the RUI;
wherein at least a part of the CUI that includes the at least one of the synonyms is displayed by the control device instead of the RUI as the user interface to the at least one slave device; and
wherein the CUI is more consistent with user interfaces of further slave devices so that the control device presents a user the user interface that includes the CUI for controlling the at least one slave device and the further slave devices.

23. The control device of claim 22, further comprising:
at least one local user interface (LUI) to at least one local application;
wherein,
said extraction logic module is further configured to extract at least one component of the LUI;

said database is further configured to store synonyms of components of an LUI;

said analysis and transformation module is further configured to v. map the extracted at least one component of the LUI to a component of the CUI according to at least one of the synonyms of components of an LUI stored in said database and a thesauri, vi. provide a user interface to the at least one local application according to at least a part of the mapping of the extracted at least one component of the LUI.

24. The control device of claim 23, wherein a synonym used for the mapping is a synonym used in the LUI.

25. The control device of claim 22, wherein said analysis and transformation module is further configured to:

vii. accept a set of user preferences; and viii. provide said at least a part of the mapping in accordance with the set of user preferences.

26. The control device of claim 22, wherein the thesauri is accessed via another network.

27. The control device of claim 26, wherein the another network is the Internet.

28. The control device of claim 22, wherein the slave device is a consumer electronic device.

29. The control device claim 28, wherein the network is a home network.

30. The control device of claim 22, wherein the network is a home network.

31. The control device of claim 22, wherein the mapping includes determining a pre-set synonym CUI component for the extracted at least one component of the RUI, and replacing the extracted at least one component of the RUI with the pre-set synonym CUI component by the control device whenever the control device displays a user interface for controlling the at least one slave device.

* * * * *